March 17, 1964 J. H. ELLIS 3,125,345
DUMP TRUCK UNLOADING AND SPREADING MECHANISM
Filed Dec. 7, 1959 5 Sheets-Sheet 1

JOHN H. ELLIS
INVENTOR.

BY
ATTORNEY

March 17, 1964 J. H. ELLIS 3,125,345
DUMP TRUCK UNLOADING AND SPREADING MECHANISM
Filed Dec. 7, 1959 5 Sheets-Sheet 2

JOHN H. ELLIS
INVENTOR.

BY
*Norman S. Blodgett*
ATTORNEY

March 17, 1964 J. H. ELLIS 3,125,345
DUMP TRUCK UNLOADING AND SPREADING MECHANISM
Filed Dec. 7, 1959 5 Sheets-Sheet 3

JOHN H. ELLIS
INVENTOR.

BY
ATTORNEY

March 17, 1964 J. H. ELLIS 3,125,345
DUMP TRUCK UNLOADING AND SPREADING MECHANISM
Filed Dec. 7, 1959 5 Sheets-Sheet 4

JOHN H. ELLIS
INVENTOR.

BY
ATTORNEY

March 17, 1964 J. H. ELLIS 3,125,345
DUMP TRUCK UNLOADING AND SPREADING MECHANISM
Filed Dec. 7, 1959 5 Sheets-Sheet 5

JOHN H. ELLIS
INVENTOR.

BY
*Norman S. Blodgett*
ATTORNEY

United States Patent Office 3,125,345
Patented Mar. 17, 1964

3,125,345
DUMP TRUCK UNLOADING AND SPREADING
MECHANISM
John H. Ellis, Warrensburg, N.Y., assignor to Pyramid Truck Attachments, Inc., Warrensburg, N.Y., a corporation of New York
Filed Dec. 7, 1959, Ser. No. 857,603
10 Claims. (Cl. 275—8)

This invention relates to a dump truck mechanism and more particularly to apparatus arranged to facilitate the unloading and distribution of material from the body of a conventional dump truck.

In the construction and maintenance of roads the dump truck is an almost indispensable item, since it is by this means that the material is brought to the site where the work is to be done. Very often, however, when the material has been carried by the dump truck it is necessary to place the material by some other piece of machinery, or, if the dump truck has been constructed to perform a function such as the spreading of salt in the winter time, it cannot be used for some of the other desirable functions. This is because when the dump truck has been re-constructed to serve one function, such as the aforementioned salt-spreading function, the apparatus serving that function is in the way, so far as dumping an entire load of trap rock in one place, for instance. Attempts to provide a dump truck which will serve all the desirable spreading and placing functions have failed, apparently because the apparatus evolved in the past has been too compliacted and requires too much maintenance. These and other difficulties experienced in the past have been obviated in a novel manner by the present invention.

It is, therefore, an outstanding object of this invention to provide a mechanism for use with a dump truck which will permit it to perform material-unloading functions on a broad range of material, such as unloading through a partially open tailgate, feeding to the side from the small door at one side, and spreading material after the aforementioned feeding to the side by use of a flinger, all without detriment to the more usual functions of a dump truck.

Another object of this invention is the provision of a mechanism for use with a dump truck body which will permit controlled swinging of the tailgate and side feeding in addition to the other functions possible with a dump truck and without interference therewith.

A further object of the present invention is the provision of a mechanism for use with a dump truck body providing for the functions of the swinging of the tailgate under control and a material flinging operation which is not detrimental to the more usual functions of the dump truck.

It is another object of the instant invention to provide a mechanism for use with a dump truck body which will provide for sidewise feeding of the material and flinger type spreading of material without detriment to the normal functioning of the dump truck body and its tailgate.

It is a further object of the invention to provide a tailgate swinging mechanism which can be operated from the cab of the truck and which, nevertheless, will not interfere with the novel operation of the tailgate.

A still further object of this invention is the provision of a side feed mechanism which is hydraulically operated, which is simple in construction, is relatively free of maintenance problems, and which is capable of a long life of useful service.

A still further object of this invention is the provision of a flinger mechanism for use with a dump truck in which the mechanism is relatively free of difficulties due to the tilting of the body by the normal dumping mechanism and of which a novel method of suspending the flinger is used for simple mounting and removal.

It is a still further object of the present invention to provide a side feed mechanism for use with a dump truck body in which a simple and relatively maintenance-free use of rotary hydraulic motors combined with a novel type of tailgate result in unusually effective feeding of material to one side of the truck.

Another object of the invention is the provision of a tailgate for use with a dump truck which will add considerably to the capacity of the truck and at the same time will provide for normal gravity feeding of the material in the truck to one side for release through a small side door, thus resulting in side feeding of the material.

Another object of the invention is the provision of a tailgate apparatus for use with a dump truck body in which a tailgate of unusual configuration combines effectively with apparatus driven from a common hydraulic pressure fluid source to provide for feeding of material through a side door for spreading of material by means of a flinger and for controlled operation of the swinging of the tailgate itself.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which.

For the purposes of this specification the expression "longitudinal" shall be used to indicate the direction lengthwise of the dump truck, and the expression "transverse" will be used to indicate a direction at a right angle to the length of the dump truck, or in other words, from side to side thereof.

Figures 1, 2, 3, 4:
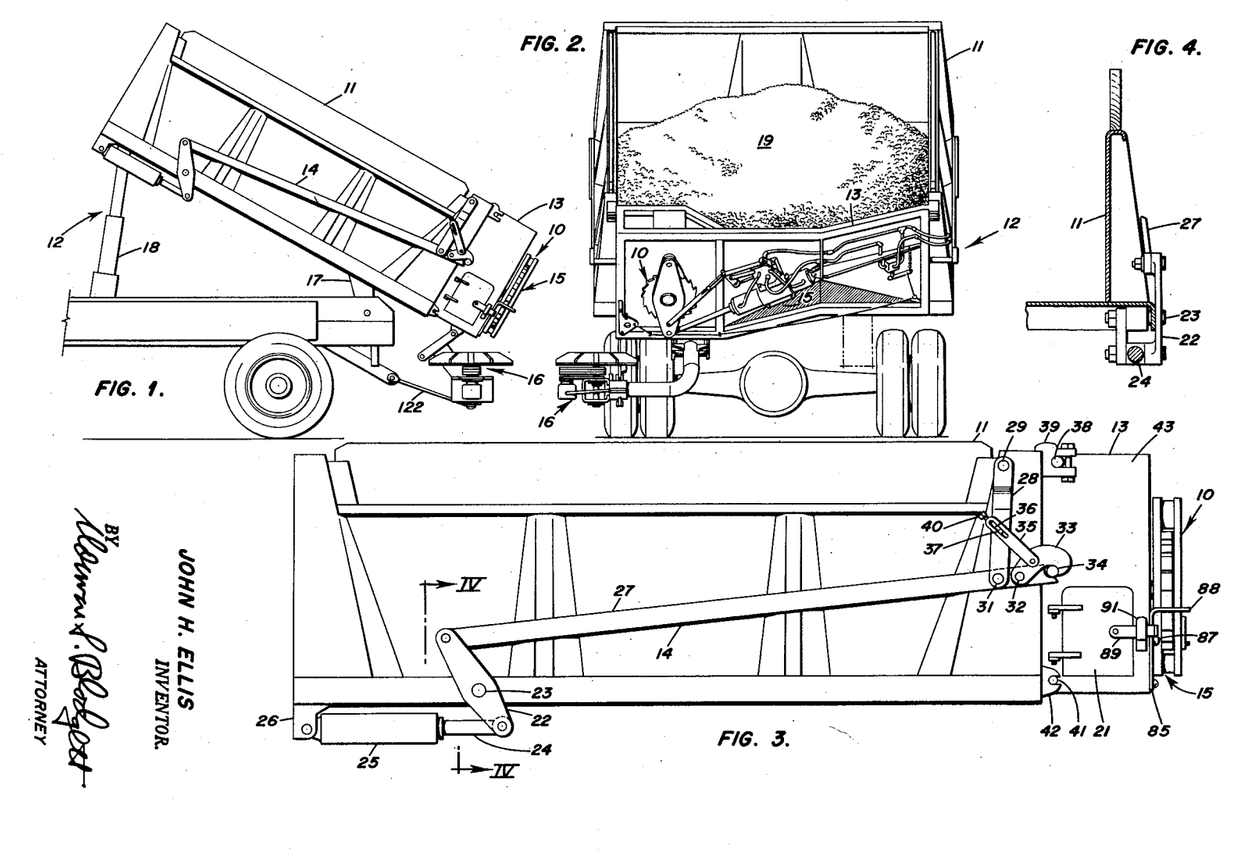
FIG. 1 is a side view of a dump truck with portions broken away constructed according to the principles of the present invention.
FIG. 2 is a rear view of the apparatus shown in FIG. 1.
FIG. 3 is a side view of the body of the dump truck somewhat enlarged.
FIG. 4 is a section of the apparatus shown in FIG. 3 taken on the line IV—IV thereof.

Referring first to FIGS. 1 and 2 wherein are best shown the general features of the invention, the dump truck mechanism indicated generally by the reference numeral 10, is shown as associated with the body 11 mounted on a dump truck 12. The mechanism 10 is shown as consisting of a tailgate 13, a tailgate swinging mechanism 14, a side feed mechanism 15, and a flinger mechanism 16. The body 11 is shown in elevated position pivoted about a hinge 17 by means of a dumping cylinder 18. The body is shown as approximately half full of a body 19 of material which material may be sand, trap rock, salt, or any one of a number of substances normally used in road construction and maintenance.

Referring now to FIGS. 3 and 4, the tailgate swinging mechanism 14 is shown in some greater detail when associated with the tailgate 13 mounted on the body 11. This view shows somewhat the side feed mechanism 15 and a small side door 21. A crank lever 22 is pivotally mounted to the frame of the body 11 by means of a pivot pin 23. The lower end of the lever 22 is pivotally connected to the piston rod 24 of a hydraulic cylinder 25. The end of the cylinder 25 away from the piston rod 24 is pivotally connected to an abutment 26 extending downwardly from the forward lower edge of the body 11. At its upward end the lever 22 is pivotally connected to one end of an actuating rod 27 which extends longitudinally of the body 11 from the lever 22 to the tailgate 13. The rearward end of the rod 27 is supported by a swinging link 28 which is pivotally attached to the body 11 at its upper end by a pivot pin 29. The lower end of the swinging link 28 is pivotally attached to the actuating rod 27 some distance from its rearward end by a pivot pin 31. Pivotally attached to the rod 27 by means of a pivot pin 32 located between the pivot pin 31 and the extreme rearward end of the rod 27 is a jaw member 33 having a somewhat quarter-moon configuration with the concavity facing a similarly formed portion of the end of the rod 27, the jaw member 33 and the configurated end of the rod 27 forming a clamp adapted to engage an abutment or peg 34 extending laterally of the forward edge of the tailgate 13. Pivotally connected to an intermediate portion of the jaw member 33 is a link 35 having an elongated slot 36 formed in its other end and an adjusting screw 40 extending into the slot from the end of the link 35. Extending through the slot is a pin 37 extending transversely from the side of the swinging link 28. In this connection it should be noted that a hinge pin 38 extends transversely from each side of the tailgate 13 and is enclosed in a female hinge member 39 so that it may swing about the horizontal axis defined by the pins 38. At the bottom corners of the tailgate, which, incidentally, has a box-like configuration, are situated locking pins 41 which extend into a bifurcated abutment 42 extending from the rear edge of the body 11 of the truck. It will be understood that the pin 41 resides in the bifurcated abutment 42 when the body is in a closed condition, but that the tailgate swinging mechanism 14 serves to swing the tailgate 13 about the horizontal axis defined by the pins 38 in a manner which will be described more fully hereinafter.

Figure 5:
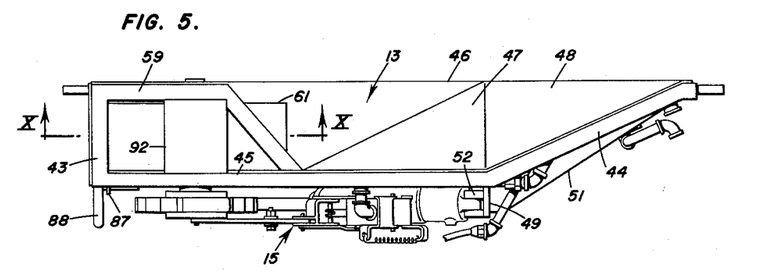
FIG. 5 is a plan view of a tailgate and associated apparatus forming a part of the invention.
Figure 6:
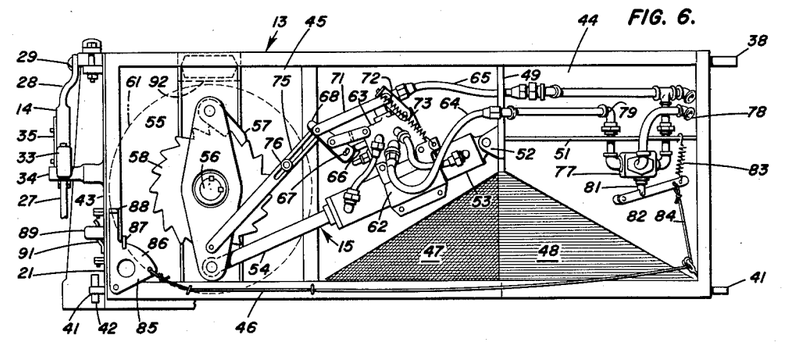
FIG. 6 is a vertical rear view of the tailgate shown in FIG. 5.
Figure 7:
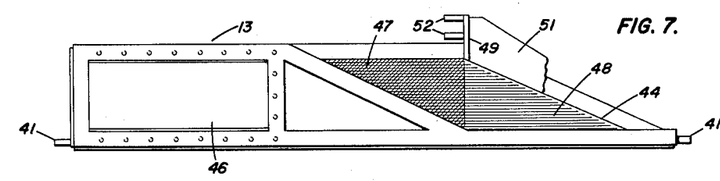
FIG. 7 is a bottom view of the tailgate.
Figure 8:
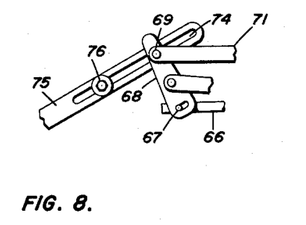
FIG. 8 is an enlarged view of a portion of the apparatus shown in FIG. 6.

Referring now to FIGS. 5, 6, and 7 wherein are more specifically shown the construction of the tailgate 13 and the side feed mechanism 15, it is interesting to note certain details shown in this view of the tailgate swinging mechanism 14, including the pivot pin 29, the swinging link 28, the jaw member 33, and the actuating rod 27 as well as the peg 34 extending laterally from the tailgate 13. The tailgate 13 is shown as being of a generally box-like configuration open at the top and having a substantially vertical end wall 43 which extends longitudinally and an inclined end wall 44 which slopes downwardly and inwardly toward the other wall which, incidentally, is provided with the small end wall door 21, a rear transverse wall 45 having a substantial vertical extent adjacent the end wall 43. It should be noted at this point that the end wall 44 is in a vertical plane which extends diagonally of the entire apparatus and culminates in its lower end in the bottom which is made up of three parts, a flat portion 46 and two inclined portions 47 and 48, these portions sloping downwardly and in the direction of the end wall 43 so that material will slide toward the corner of the tailgate occupied by the door 21. Welded along the juncture of the rear wall 45 and the end wall 44 is a mounting plate 49 which extends vertically and a shelf 51 which extends horizontally from the mounting plate 49 along the surface of the end wall 44. Extending in the other direction from the mounting plate 49 are a pair of ears 52 in which is pivotally mounted the end not having the piston of a hydraulic cylinder 53. The piston rod 54 is attached to one end of a lever 55 which is rotatably mounted in its central portion on a shaft 56. On the other end of the lever 55 is mounted a pawl 57 which engages the teeth of a ratchet 58, the ratchet and pawl being formed so that clockwise movement of the lever 55 brings about similar clockwise movement of the ratchet 58. It should be noted that the ratchet 58 is keyed to the shaft 56 while the lever 55 is free to rotate relative to this shaft. The shaft 56 is mounted in two bearings, one enclosed within the wall 45 and the other within a supporting wall 59 which is parallel to and spaced from the rear wall 45. Although the wall 59 is shown as extending downwardly to the bottom 46, it is possible, as an alternative construction, for it to extend downwardly only far enough to support the bearing for the shaft 56; in such a case, the material would be permitted to flow to the wheel 61 without any intervening barrier. Keyed to the shaft is an impellor wheel 61. Mounted on the central portion of the cylinder 53 is a saddle 62 to which is suitably bolted a reversing valve 63 to which is attached a high pressure hydraulic fluid line 64 and a low pressure or return line 65. The reversing valve 63 is provided with a plunger 66 having a pin 67 extending transversely of its outer end. This pin resides in a slot (see FIG. 8) formed in one end of a valve plunger control lever 68. At its other end the lever 68 is provided with a pin 69 by which it is pivotally attached to a link 71 leading to an over-center spring assembly having a lever 72. The lever 72 is pivoted to the valve housing at one end, is pivotally connected to the other end of the link 71 at its intermediate portion and at its outer end is attached to a coil spring 73 the other end of which is attached to a special bracket associated with the saddle 62. In its intermediate position the lever 72 and the spring 73 are in alignment, thus providing for an over-center operation.

The pin 69 associated with the outer end of the control lever 68 also rides in a slot 74 formed in one end of a link 75, the other end of which is pivotally attached to the lever 55 at a point between the shaft 56 and the end to which the piston 54 is attached. Mounted also in the slot 74 is an adjustable stop 76. The high pressure line 65 is connected to a three-way hydraulic diversion valve 77 from which a hose 78 is connected to a fluid power source (not shown). A line 79 connects the valve 77 to the return line 65. The diversion valve 77 is provided with a plunger 81 which is connected to the intermediate portion of a lever 82 pivotally attached to the tailgate, the free end of which is biased in an upward position by means of a coil spring 83. The free end of the lever 82 is connected by means of a cable 84 to an interlock plate 85 at the other end of the tailgate adjacent the door 21. The plate 85 is pivoted to the tailgate at the lower corner and is provided with a cam-like edge 86 which rides in a notched guide 87 (see FIG. 3). At its upper end the plate 85 is provided with a rearwardly extending arm 88; it should be noted that counter-clockwise left hand rotation of the plate 85 about its pivot point will cause the actuation of the plunger 81 of the valve 77. However, as is quite evident in FIG. 3, a latch 89 pivotally attached to the free side of the door 21 prevents movement of the plate in this manner when the said latch resides within its clip 91 attached to the tailgate, so that it is clear that it is impossible to actuate the plate 85 by means of the arm 88 unless the door 21 is open.

Figures 9, 10, 11, 12, 13, 14:
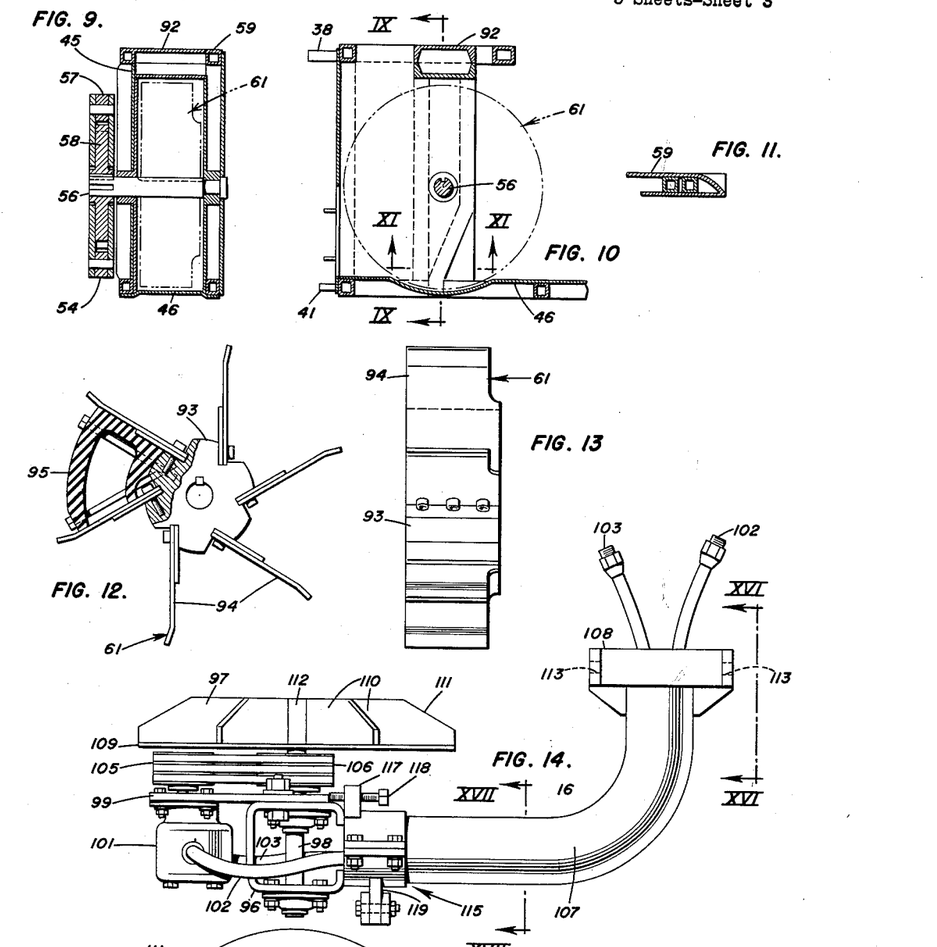
FIG. 9 is a sectional view of an impellor wheel housing forming part of the invention taken on the line IX—IX of FIG. 10.
FIG. 10 is a further sectional view of the impellor wheel housing and associated apparatus taken on the line X—X of FIG. 5.
FIG. 11 is a sectional view of a portion of the apparatus of FIG. 10 taken on line XI—XI thereof.
FIG. 12 is a side view of the impellor wheel with the supporting apparatus removed.
FIG. 13 is a side view of the same wheel.
FIG. 14 is an elevational view of an impellor mechanism forming part of the apparatus of the invention.

FIGS. 9, 10 and 11 show quite clearly the box-like construction built into the corner of the tailgate for supporting the impeller wheel 61. The wheel is shown as residing between the rear wall 45 and the supporting wall 59. Directly above the shaft 56 a heavy beam section 92 extends between the rear and supporting wall to lend rigidity to the structure. As is evident in FIG. 11, the lower right hand edge of the supporting wall 59 is beveled to provide for a ready flow of material thereby. In FIGS. 12 and 13 the impeller wheel 61 is shown in detail. It consists of a hub 93 adapted to be keyed to the shaft 56. Spring steel blades 94 are bolted to suitable lands formed in the hub and provision is made for inserting between certain pairs of the blades a filler piece 95 formed preferably of rubber to decrease the spreading rate without changing the speed of the wheel on certain occasions.

Figure 15:
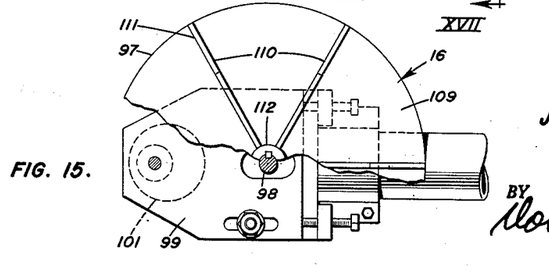
FIG. 15 is a plan view with portions broken away of the impellor mechanism shown in FIG. 14.
Figures 16, 17, 18, 23:
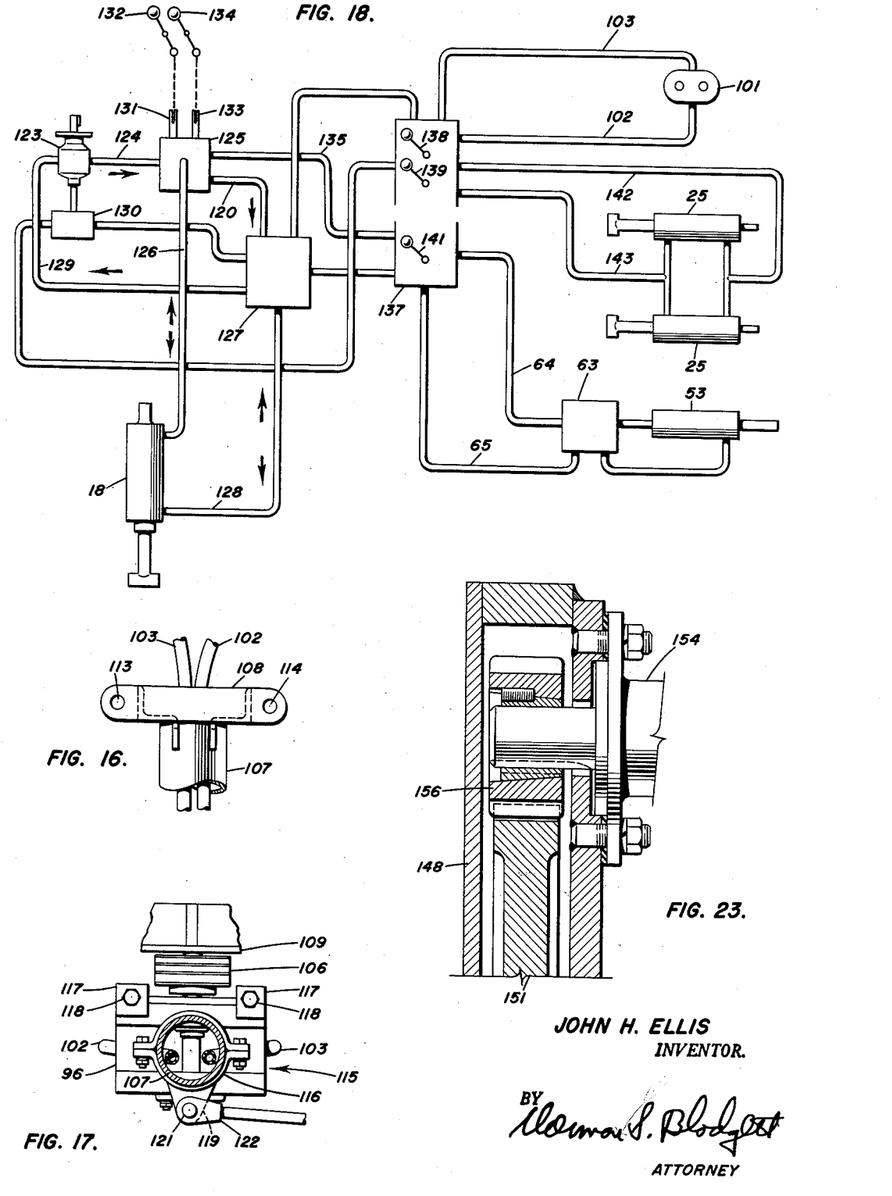
FIG. 16 is a view of a portion of the apparatus of FIG. 14 as observed from the line XVI—XVI of that figure.
FIG. 17 is a sectional view taken on the line XVII—XVII of FIG. 14.
FIG. 18 is a somewhat schematic view of the hydraulic circuits forming part of the present invention.
FIG. 23 is an enlarged view of a portion of the apparatus of FIG. 1 in section taken on the line XXIII—XXIII of FIG. 20.

Referring now to FIGS. 14 and 15, which show the details of the flinger mechanism 16, it can be seen that a main flinger body 96 is provided to support a flinger wheel 97 on a normally vertical axis determined by a shaft 98 to the upper end of which the wheel is keyed. The shaft 98 is mounted in suitable bearings bolted to the main body 96. A portion of the main body consists of a laterally extending plate 99 on the lower side of which is mounted a rotary hydraulic motor 101 having a high pressure line 102 and a return line 103 connected thereto. The output shaft of the motor 101 extends vertically through the plate and has attached thereto a multi-sheave pulley 104, which is connected by V-belts 105 to a similar pulley 106 keyed to the shaft 98. An L-shaped tubular arm 107 is secured to the main body 96 at one end and at the other end is provided with a head 108. The lines 102 and 103 extend through the tubular arm 107 and emerge from the head 108. As is evident in the figures, the flinger wheel 97 consists of a disk-like horizontal plate 109 and a series of plate-like fins 110 mounted vertically thereon. The outer ends of the fins have a pronounced diagonal edge 111. The inner ends of the fins are welded to a central hub 112 which is keyed to the shaft 98. The details of the head 108 are shown in FIG. 16 which is an elevational view taken from the side of the view shown in FIG. 14. Suitable bores 113 and 114 are provided at the ends of the box-like construction to provide for pivotal attachment of the L-shaped tubular arm 107 and the entire finger mechanism to the lower side of the body 11 in the manner shown in FIGS. 1 and 2. The details of the outer end of the tubular arm 107 are shown in FIG. 17 wherein a head 115 is shown as being separable from the arm 107 and welded to the main body 96. A split collar 116 clamps around the end of the arm 107 and holds it in fixed relationship to the main body 96. Vertical ears 117 are provided with threaded apertures to carry adjusting bolts 118 for locating the plate 99 on the remainder of the main body 96. A vertically depending ear 119 is provided with a bore 121 which is pivotally connected in a manner shown in FIGS. 1 and 2 to one end of a stabilizing rod 122 the other end of which is attached to the body of the truck.

In FIG. 18 is shown the somewhat schemmatic view of the hydraulic system forming a part of the invention. A hydraulic pump 123 with a small auxiliary pump 130 connected thereto, preferably of the vane-type and which is driven from the truck engine, is connected by an output line 124 to a valve 125. The valve 125 is connected by a line 126 to the single-acting hoist cylinder 18 of the truck. A return line 120 connects the valve 125 to a reservoir 127 and the lower part of the cylinder 18 is connected by a return line 128 to the reservoir. A low pressure line 129 connects the reservoir to the input side of the pump 123. A plunger 131 associated with the valve 125 is actuated by means of a handle 132 situated in the cab of the truck. In one position of the plunger 131 pressure oil is admitted to the line 126 and to the upper side of the cylinder 18. In the other position, the line 126 is connected to the return line 120 so that the weight of the dump truck can force oil out of the cylinder into the reservoir. Another plunger 133 is actuated by a handle 134 in the cab and serves to provide high pressure oil to a line 135. A return line 136 is also connected at one end of the reservoir 127 and at the other end to a control valve 137 to which the pressure line 135 is also connected. The valve 137 is provided with three handles 138, 139 and 141 serving to control fluid flow respectively to the finger motor 101, the tailgate swinging cylinders 25 and the side feed cylinder 53. Since all of these hydraulic motors are double-acting, or reversible, the handles 138, 139 and 141 serve to present high pressure oil to one side or the other and to provide for the return of oil from the other side. The exact nature of the valve 137 is well know in the art and it is felt that no detailed description is necessary. It should be noted that lines 142 and 143 serve to carry oil from the valve 137 to the tailgate swinging cylinders 25.

Figure 19:
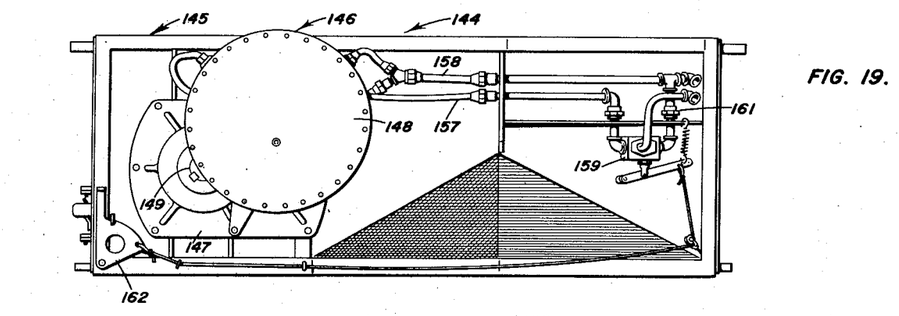
FIG. 19 is an elevational view of a tailgate and associated apparatus constituting another embodiment of the invention.
Figure 20:
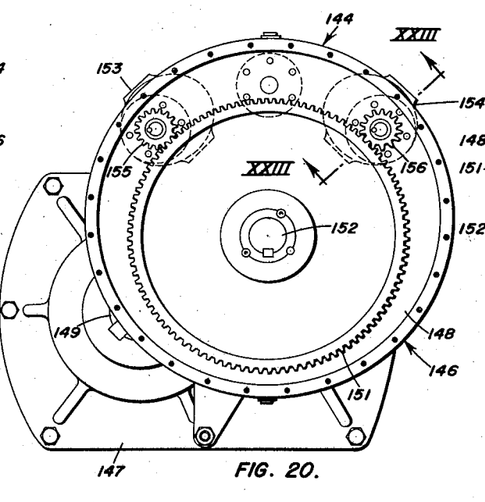
FIG. 20 is an enlarged view with portions broken away of part of the apparatus shown in FIG. 19.
Figure 21:
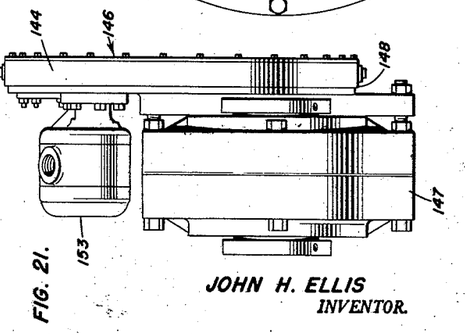
FIG. 21 is an elevational view of the apparatus of FIG. 20 as observed from one side.
Figure 22:
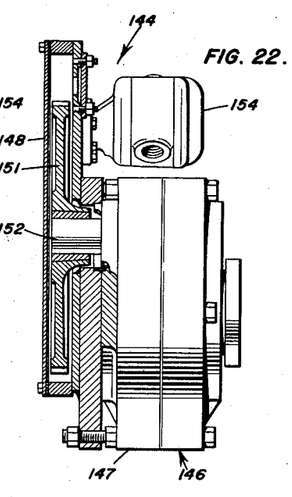
FIG. 22 is an elevational view with portions broken away of the apparatus shown in FIG. 20 as observed from the other side.

In FIGS, 19, 20, 21, 22, and 23 are shown the details of another construction for driving the side feed mechanism. The side feed mechanism shown here, indicated generally by the reference numeral 144, is shown as mounted at the rear of a tailgate 145 and having a housing 146 which is bolted to the tailgate. The housing consists of an inner portion 147 and an outer flat portion 148 of circular configuration. Housed within the inner portion 147 which is bolted directly to the tailgate is a gear reduction unit whose output is connected to the shaft 149 of the impeller wheel (not shown). Within the outer portion 148 of the housing 146 is a large gear 151 which is keyed to the input shaft 152 of the gear reduction unit enclosed within the inner portion 147 of the housing. Mounted on the inner surface of the outer portions 148 of the housing and lying between the outer portion of the housing and the tailgate surface are two rotary hydraulic motors 153 and 154 having respectively small drive gears 155 and 156 keyed to the shafts of the motors and lying within the outer portion 148 of the housing 146. These gears engage the gear 151 and serve to rotate it. The flexible high pressure line 158 and a return line 157 are connected to these motors, the high pressure line 158 is connected to a diversion valve 159 having a by-pass line 161 leading to the return line 158. An inter-lock 162 exactly similar to the apparatus shown in FIG. 6 for the same purpose is provided to assure that the diversion valve 159 does not permit high pressure oil to pass to the motors 153 and 154 unless the tailgate door is open. When connected into the hydraulic system shown in FIG. 19 the high pressure line 157 and return line 158 would be connected so as to be actuated by the handle 141. The details of the gear construction are shown in FIG. 22.

The operation of the apparatus of the invention will now be readily understood in view of the above description. Referring to FIG. 18, it can be seen that the pump 123 furnishes pressure hydraulic fluid to the conduit 124 which passes through the valve 125 to the various hydraulic motors of the apparatus and returns to the reservoir 127 before being circulated through the line 129 to the pump again. The truck operator from the cab by actuating the handle 132 is able to actuate the cylinder 18 to raise and lower the body 11 of the dump truck. By actuating the handle 134 he is able to provide power to the valve 137 and according to the settings of the handles 138, 139, and 141 is able to provide power to the motor 101, the motors 25 or the motor 53 as desired. It is, of course, possible for him to set the handles 138, 139 and 141 in a pre-determined condition and by actuating the handle 134 to cause the actuation of these motors depending upon his setting of the handles in the valve 137. A preferable arrangement would be to have the valve 137 located in the cab where he can make changes in the condition of the individual motors at will, rather than being forced to get out of the cab and change the handles when such be desired. The desirability of being able to reverse flow to some of the motors will become clear as the description progresses. Actuation of the hydraulic motor 25 in FIG. 3 to withdraw the piston rod as far into the cylinder as possible will cause the rod 27 to move rearwardly toward the pin 34. The actuation of the link 35 will cause the jaw member 33 to move clockwise about its pivot pin 32 so that the pin 34 will be grasped between the jaw member 33 and the end of the rod 27. Further actuation of the cylinder in this direction will cause the rod 27 to continue rearwardly carrying the tailgate with it. The tailgate pivots about its hinge pin 38 and the pin 41 moves out of the bifurcated abutment 42. This permits the material with which the body 11 is loaded to pass out of the truck into the space between the tailgate and the body. By setting this gap properly with the cylinder 25 the operator can spread material at a desired rate in a path as wide as the body 11. It should be noted that among other things the box-like configuration of the tailgate 13 permits an extremely large load of material to be held within the body. The fact that the tailgate is thus loaded would make it difficult to move by hand, and for that reason the tailgate swinging apparatus 14 is extremely desirable in association with this dished type of tailgate. When the cylinder 25 is actuated in the other direction so that the lever 22 moves counter-clockwise, and the piston rod 23 moves out of the cylinder, the rod 27 will move forwardly of the body. A jaw member 33 is enclosed around the pin 34 until the condition is reached which is shown in FIG. 3. Further motion in this direction causes the jaw member 33 to rotate counter-clockwise about its pivot pin 32, thus opening the clamp formed between the jaw member and the end of the rod 27. The jaw member and the end of the rod then leave the pin and move into a forward position along the side of the body. When locked in this position it is possible to use the tailgate by hand or for other operations. On the other hand, if the tailgate swinging apparatus 14 is left in the condition shown in FIG. 3, it serves to lock the tailgate against the body more securely than would otherwise be true.

The purpose of a swinging apparatus is to provide a fast and powerful control of the degree of tailgate opening for more accurate spreading of road materials. A second intent of this device is to permit tailgates of more weight and of overhanging shapes to be opened by power for spreading or free dumping. Another purpose accomplished by this apparatus is to provide quickly available independent hydraulic power for other dump truck attachments, such as the flinger mechanism at the rear. It should be understood that when sanding winter roads the tailgate would stay closed, and the hydraulic fluid would not be used for the purpose of actuating the cylinder 25.

If the handle 141 is actuated to cause hydraulic fluid passed to the motor 53 of the side feed mechanism 15, the fluid will be by-passed from the high pressure line to the return line 65 through the by-pass line 79 by the diverting valve 77, unless the lever 82 is in a downward position. To do this it is necessary to move the plate 85 counter-clockwise by means of the arm 88, but before this can be done the latch 89 must be moved out of the clip 91 and the door 21 rotated about its hinges so that the door is open. With the door open the apparatus is in condition for ejection of material from the side. So, with the plunger 81 in the downward position the diverting valve 77 is conditioned so that fluid under pressure appears in the line 64 and at the valve 63. Now, the valve 63 connects one side of the cylinder to pressure fluid and the other side to the return line depending upon the position of the plunger 66. With pressure fluid appearing at the right side of the cylinder 53 the piston rod 54 moves to the left in FIG. 6 and moves the lever 55 clockwise. The pawl engages the ratchet 58 and rotates the shaft 56 thus rotating the impellor wheel 61. As the piston rod 54 reaches its most extended position, the link 75 has carried the control lever 68 counter-clockwise to an extreme position and this has caused the plunger 66 to move inwardly into the valve with a slight lost motion due to the slot and the pin 67. With the plunger in its innermost position, the valve 63 causes pressure fluid to appear at the piston end of the cylinder 53 and connects the other end to the return line 65, thus causing the piston rod to be retracted. This causes counter-clockwise rotation of the lever 55 and causes the pawl 57 to pass over the ratchet 58 without rotating it. In order to cause the plunger 66 to move rapidly from its innermost position to its outermost position so that the reciprocation of the cylinder 53 takes place rather rapidly, the over-center spring 73 and its associated levers 71 and 72 come into operation. For instance, when the piston rod 54 is moving outwardly of the cylinder 53, as the spring 73 passes over dead center it causes the lever 71 to push the outer end of the control lever 68 so that it moves rapidly to push the plunger 66 into the valve. In making this rapid movement the lever 68 with its pin 69 slides in the slot 74 in the link 75 and is not retarded thereby. In the other direction the outer end of the lever 68 is engaged by the adjustable slot 76 to carry the spring over dead-center in the other direction and to cause the lever 68 to move the plunger 66 rapidly to its outermost position. The reciprocation of the cylinder 53 in this manner causes the wheel 61 to rotate and to throw material from the tailgate through the door 21 onto the surface to which the material is to be applied.

The shape of the tailgate 13 adds a great deal to the general overall effect of the apparatus which forms the basis of this invention. It can be seen, first of all, that the dished shape of the tailgate adds considerably to the volume of material that may be carried by a dump truck using this tailgate. Secondly, the sloping of the inclined portions 47 and 48 of the bottom causes material to slide to the left in FIG. 5, or toward the impeller wheel 61. This is particularly true when the body 11 is inclined by means of the cylinder 18 in the usual way. Even without the impeller wheel material will pass through the door 21 until all of the material has been cleared from the container formed by the body 11 and the tailgate 13. It will be observed that there are no rearward corners of any appreciable size to collect material that would be difficult ot expel from the truck and, if it is necessary for an operator to get into the body to clean it, the sloping surfaces 47 and 48 when the truck is tilted will be very close to horizontal and provide an excellent standing place. The box-like construction formed by the supporting wall 59 and the beam section 92 combine with the other structural elements at the left side of the tailgate to provide a strong construction for the protection of the impeller wheel and for rigidly supporting the other portions of the tailgate.

The flinger mechanism 16 shown in FIGS. 14 and 15 is particularly useful when expelling material from the door 21 by means of the impeller wheel 61. Material leaving the door falls to the left side of the truck in a steady readily controlled stream and will fall directly onto the flinger wheel 97. Assuming that the operator has actuated the handle 138 to cause pressure fluid to flow through the hydraulic motor 101 associated with the flinger, the wheel 97 will be rotating and will throw the sand in a horizontal plane in all directions, thus spreading sand or other material in the desired manner. The flinger is suspended by means of the tubular arm 107 from the rear corner of the body 11, the center of gravity being selected so that when it is so suspended by means of pins inserted through the body extending into the bores 113 or 114 of the head 108 the wheel 97 will be approximately horizontal. The stabilizing rod 22 connects the ear 119 to the truck proper and serves to prevent undue swinging of the flinger mechanism.

It should be noted that, with the preset hydraulic circuitry, stopping, starting, speeding or slowing of the side-dump mechanism has no appreciable effect on the control of the rate of action of the motor 101 or of motors 25 and vice versa. The stabilizing rod 122 connects the ear 119 to the truck proper and serves to prevent any swinging, fore and aft, of flinger mechanism; so that the center line of flinger shaft 98 stays practically vertical through all dump body angles. This verticality is maintained by choosing a location for the truck end of stabilizing rod 122 such that a parallelogram of linkage centerlines is created, and therefore the center line of shaft 98 is always normal to the plane of the road on which the truck's wheels rest. By controlling the flow of fluid to the motor 101, it is possible, of course, to control the speed of the flinger wheel which is desirable in some situations. With this arrangement, there is an immediate start and stop and immediate speed change control of feed rate and of flinger rotation. This is a novel independence of control yielding practical advantages not previously achieved to this degree in spreader mechanisms attached to dump trucks, and not practical to achieve in previous spreaders driven by such cumbersome and inefficient means as independent small gas engines, or as line-shaft drive from truck engines, or as various arrangements to pick up rotative power from the truck wheels or from wheels drawn along the road surface. The apparatus is simple and inexpensive and shares the hydraulic system with the other portions of the present apparatus. Furthermore, the use of pins to attach the flinger mechanism to the truck body and to the truck means that the apparatus is quickly installed and removed. It is, of course, compact to store and involves almost no maintenance. Since the flinger is situated at the left so that the truck in the preferred embodiment with end feeding of material to it, the left end of the truck can move along the center line of the road and this permits job-controlled one-man sanding with two lanes at any given time. Furthermore, the driver can see what is going on and see the results which he is obtaining. This apparatus does not modify the truck for general use as do many other types of spreader arrangements. There is no decrease in truck load capacity as compared with special spreader bodies in present use. The raising of the body 11 of the truck controls the balance of the material in the truck and controls the feed of discharge so that the mechanism is not overloaded at the start or starved at the finish of unloading. Furthermore, by actuating the handles 138 and 141, the operator can control not only the feed impeller wheel 61 by means of the cylinder 53 but also the flinger wheel 97 by means of the motor 101 so that the feed rate can be set in accordance with a desired spreading rate.

The operation of the side feeder drive, which is shown in FIGS. 19 through 23, is readily understood. The rotary hydraulic motors 153 and 154 would be inserted in the circuit occupied by the lines 64 and 65 and would take the place of the cylinder 53. In this situation, of course, a reversing valve 63 is not necessary since this can be accomplished by means of the handle 141 in the valve 137. The rotation of the hydraulic motors 153 and 154 causes rotation also of the gears 155 and 156, thus driving the large gear 151 and in turn driving the shaft 152. The driving force moves through the gear reducing unit enclosed in the inner portion 147 of the housing and the output shaft of the gear reduction unit is connected to the shaft 149 of the impeller wheel 61. This arrangement has some advantage over the side sheet arrangement shown in FIG. 6 since it is readily reversible, which might be necessary in case of clogging or the like. Furthermore, with this apparatus rotation of the impeller wheel 61 is continuous and gives continuous feeding. It is possible with this embodiment of the invention to produce a drive which is made up principally of commercially available hardware and all moving parts are permanently aligned and lubricated and encased within the housing.

In connection with FIG. 6 and the description of the operation of the side feed mechanism 15, it should be noted that the valve 63 is a standard one-plunger four-way three-position valve with a safety by-pass, which is commercially available. It is special only in that it is dependent at the end positions of the plunger but not at the center. In the condition shown in FIG. 6 the retraction of the cylinder is beginning with the valve plunger 66 in and the flow to the piston retract is full open. The retraction moves the adjustable stop 76 located in the long link 75 to engage the valve plunger control lever 68. After this stop meets the lever a fraction of an inch more retraction takes place at full flow until the short pin slot in the lower end of the valve control lever is moved to engage the valve plunger pin 67 which will then be pulled from its depended position by the lever. The traction continues a fraction of an inch more at slackening speed due to the movement of the plunger, but before the valve plunger has reached the center shut-off position the valve control lever 68 has passed its own center position so that the inter-connected over-center spring 73 pulls the valve control lever on over to its limit with a snap. The top pin of the valve control lever 68 simply flies out freely in the long pin slot 74 of the link 75. The plunger has, therefore, thrown the mechanism from a slackening retract into a full flow extend. The extend motion and linkage action is an exactly similar half cycle in reverse direction except slower and more powerful due to the volume of oil used. By means of the short slot for the valve plunger pin 67 the valve never quite reaches the stopped center position before the over-center spring snaps over to pull it into the full flow opposite end position. Therefore, this valve is at either one full flow position or the other continuously except for an end stroke throttling of momentary duration and the time it takes the spring to snap. According to the drawing the adjustment of the stop 76 on the link 75 can vary the stroke in ratchet action to span from 1 to 4 teeth. Also, by use of a throttling valve piston speed can be reduced. The combination of the particular inclined dished tailgate and tilted body with an impeller wheel that stops and starts will result in material slipping between the blades with a minimum of voids occurring, and also a minimum of segregation of mixtures. Obviously, the impeller wheel action is positive to move the material out of the door 21. The driver's control of the dump body truck angle will give a more or less forceful feed to the wheel intake. Left side ejection allows the operator to observe the results as well as to place material at the center line of the road for salting and sanding in winter, and also for asphalt patchwork from its right hand lane. For ejection of material in transit, the division valve 77 is wide open and the ejection door is removed so that ejection is controlled from the valve in the cab. For placement work, the driver's valve is detented open and the interlocking door and valve handles at the rear are operated from the ground with convenience very much like the drawing of water from a faucet. It is not intended that the last few shovelsful of material will clean themselves out through the side feed mechanism. Rather, such material can be left in, or opening the tailgate by means of the tailgate swinging mechanism 14 will do the job.

So far as the shape of the tailgate is concerned, it is important to notice that the intake to the impeller wheel draws from the top and from the bottom of the load, also, to the center from both sides of the truck so that there is a minimum of stratified slippage to harm the quality of mixes. Once in the wheel, each quantity caught goes out as a unit. Also, the shape of the tailgate adds to the truck's volumetric capacity, lengthens its effective loading area, and averts off-the-rear spillage in transit. In connection with the side feed mechanism it should be noted that this fulfills a need for a truck which will dump to the side of its line of travel. For shoulder, curve or berm work, filling ruts, placing asphalt, shooting asphalt mixes to construct sidewalks, feeding an asphalt spreader from an adjacent lane, feeding an asphalt curb-forming machine and so on the present apparatus is very useful. When this same arrangement can be opened hydraulically for spreading and equipped with a filler mechanism for one-manned, two-lane winter sanding it would appear that the present invention has a great deal to offer in versatility, convenience and increased production. It is obvious that minor changes may be made in the form and construction of the invention without departing from the material spirit thereof. It is not, however, desired to confine the invention to the exact form herein shown and described, but it is desired to include all such as properly come within the scope claimed.

Invention having been thus described, what is claimed as new and desired to secure by Letters Patent is:

1. A mechanism for use with a dump truck body, comprising a dished tailgate having a vertical plane side wall, a door opening in the said side wall, an impeller wheel mounted in the tailgate adjacent the said door for rotation about a horizontal axis, a hydraulic motor connected to the wheel for the rotation thereof, a main flinger body suspended from the truck body under the said door, a flinger wheel mounted on the flinger body for rotation about a vertical axis, a hydraulic motor on the flinger body connected to the flinger wheel for the rotation thereof, and a common source of hydraulic power to which both motors are connected.

2. A mechanism for use with a dump truck body, comprising a dished tailgate having a vertical plane side wall, a door opening in the said side wall, the bottom of the tailgate inclining downwardly toward the door, an impeller wheel mounted in the tailgate adjacent the said door for rotation about a horizontal axis, a reciprocable hydraulic cylinder connected to the wheel for the rotation thereof, a main flinger body suspended from the truck body under the said door, a flinger wheel mounted on the flinger body for rotation about a vertical axis, a lever connecting the lower part of the flinger body to the truck chassis, a hydraulic motor on the flinger body connected to the flinger wheel for the rotation thereof, and a common source of hydraulic power to which both motors are connected.

3. Mechanism for use with a dump truck body, comprising a dished tailgate having an outwardly-directed bow-shaped upper edge and having a vertical plane side wall, a door opening in the said side wall, an impeller wheel mounted in the tailgate adjacent the said door for rotation about a horizontal axis extending longitudinally of the body, and a hydraulic motor connected to the wheel for the rotation thereof.

4. Mechanism for use with a dump truck body, comprising a dished tailgate having a vertical plane side wall, a door opening in the said side wall, the bottom of the tailgate inclining downwardly toward the door, an impeller wheel mounted in the tailgate adjacent the said door for rotation about a horizontal axis extending longitudinally of the body, a hydraulic cylinder, a ratchet-and-pawl mechanism connecting the cylinder to the wheel, a reversing valve mounted on the tailgate, the valve being adapted to be connected to a source of hydraulic pressure fluid and to the cylinder for presenting pressure fluid alternately to the ends of the cylinder, and a linkage connecting the said ratchet-and-pawl mechanism to the valve to reverse the valve at each end of the cylinder stroke.

5. Mechanism for use with a dump truck comprising a main body, a flinger wheel mounted for rotation about a vertical axis, a rotary hydraulic motor on the body below the wheel and connected to the wheel for the rotation thereof, an L-shaped hollow arm pivotally connected at one end to the truck body at a point spaced laterally from the wheel and connected at the other end to the said main body above the motor for the suspension thereof, the arm extending laterally away from the body and wheel before extending upwardly for connection to the truck body, and a link pivotally connected at one end to the lower part of the main body and at the other end to the truck chassis to maintain the axis of the flinger wheel substantially vertical despite changes in the angularity of the truck body, flexible conduits leading from the motor through the hollow arm and adapted to be attached to a source of hydraulic pressure fluid.

6. Mechanism for use with a dump truck body, comprising a dished tailgate having a vertical plane side wall, a door opening in the said side wall, the bottom of the tailgate inclining downwardly toward the door, an impeller wheel mounted in the tailgate adjacent the said door and having a horizontal shaft mounted for rotation about a horizontal axis, the shaft extending outwardly of the tailgate, a gear fastened to the shaft, a housing enclosing the gear, and two rotary hydraulic motors mounted on the housing and connected in driving relation to the said gear.

7. A tailgate apparatus for use with a dump truck body, comprising a tailgate having a vertical first end wall adapted to constitute an extension of a side wall of the truck body, a door located in the lower part of the side wall, a second end wall in generally opposed relation to the first end wall, the second end wall having an upper edge which extends diagonally across the tailgate, the second end wall sloping forwardly and downwardly to cause material to slide toward the first end wall, a hydraulically-driven impeller wheel mounted within the tailgate adjacent the door, a hydraulically driven swinging mechanism connected to the tailgate at a point below the upper edge thereof, a hydraulically-driven flinger suspended beneath the door, and a common source of hydraulic pressure fluid connected to all the swinging mechanism, flinger, and impeller wheel.

8. Mechanism for use with a dump truck body, comprising a dish tailgate having a vertical plane side wall, a door opening in the side wall, the bottom of the tailgate inclining downwardly toward the door, an impeller wheel mounted in the tailgate adjacent the side door for rotation about a horizontal axis extending longitudinally of the body, the shaft extending outwardly of the tailgate, a gear fastened to the shaft, a housing enclosing the gear, and two rotary hydraulic motors mounted on the housing and connected in driving relation to the said gear, each motor consisting of a hydraulic cylinder, a ratchet-and-pawl mechanism connecting the cylinder to the wheel, a reversing valve mounted on the tailgate, the valve being adapted to be connected to a source of hydraulic pressure fluid and to the cylinder for presenting pressure fluid alternately to the ends of the cylinder, and a linkage connecting the said ratchet-and-pawl mechanism to the valve to reverse the valve at each end of the cylinder stroke.

9. A tailgate apparatus for use with a dump truck body, comprising a tailgate having a vertical first end adapted to constitute an extension of a side wall of the truck body, a door located in the lower part of the side wall, a second end wall in generally opposed relation to the first end wall, the second end wall having an upper edge which extends diagonally across the tailgate, the second end wall sloping forwardly and downwardly to cause material to slide towards the first end wall, a hydraulically-driven impeller wheel mounted within the tailgate adjacent the door, a hydraulically-driven swinging mechanism connected to the tailgate at a point below the upper edge thereof, a hydraulically-driven flinger suspended beneath the door, a common source of hydraulic pressure fluid connected to all the swinging mechanism, flinger, and impeller wheel, a hydraulic cylinder, a ratchet-and-pawl mechanism connecting the cylinder to the wheel, a reversing valve mounted on the tailgate, the valve being adapted to be connected to a source of hydraulic pressure fluid and to the cylinder for presenting pressure fluid alternately to the ends of the cylinder, and a linkage connecting the said ratchet-and-pawl mechanism to the valve to reverse the valve at each end of the cylinder stroke.

10. A tailgate apparatus for use with a dump truck body, comprising a tailgate having a vertical first end wall adapted to constitute an extension of a side wall of the truck body, a door located in the lower part of the side wall, a second end wall in generally opposed relation to the first end wall, a second end wall having an upper edge which extends diagonally across the tailgate, the second end wall sloping forwardly and downwardly to cause the material to slide toward the first end wall, a hydraulically-driven impeller wheel mounted within the tailgate adjacent the door, and having a horizontal shaft mounted for rotation about a horizontal axis, the shaft extending outwardly of the tailgate, a gear fastened to the shaft, a housing enclosing the gear, and two rotary hydraulic motors mounted on the housing and connected in driving relation to the said gear, a hydraulically-driven swinging mechanism connected to the tailgate at a point below the upper edge thereof, a hydraulically-driven flinger suspended beneath the door, and a common source of hydraulic pressure fluid connecting to the swinging mechanism, flinger, and impeller wheel.

References Cited in the file of this patent

UNITED STATES PATENTS

| | | |
|---|---|---|
| 1,909,238 | Thompson | May 16, 1933 |
| 2,239,029 | Barrett | Apr. 22, 1941 |
| 2,338,320 | Donovan et al. | Jan. 4, 1944 |
| 2,421,211 | Lutz | May 27, 1947 |
| 2,442,743 | Wester | June 1, 1948 |
| 2,484,325 | Wachter | Oct. 11, 1949 |
| 2,645,522 | Kersey | July 14, 1953 |
| 2,698,184 | Bowen | Dec. 28, 1954 |
| 2,799,510 | Schmidt | July 16, 1957 |
| 2,879,910 | Johnson | Mar. 31, 1959 |
| 2,967,056 | D'Amato | Jan. 3, 1961 |
| 2,997,213 | Richards et al. | Aug. 22, 1961 |
| 3,010,727 | Swenson et al. | Nov. 28, 1961 |
| 3,018,908 | Wilton et al. | Jan. 30, 1962 |
| 3,019,025 | Young | Jan. 30, 1962 |

FOREIGN PATENTS

| | | |
|---|---|---|
| 491,140 | Canada | Mar. 10, 1953 |